(12) United States Patent
Ulm et al.

(10) Patent No.: US 11,975,811 B2
(45) Date of Patent: May 7, 2024

(54) INTEGRATED WAVE ENERGY CONVERTER AND DOCKING STATION WITH RAMPED CLOVERLEAF SUPPLEMENTAL HEAVE PLATE

(71) Applicant: HAWAII OCEAN POWER SOLUTIONS LLC, Kailua, HI (US)

(72) Inventors: Nicholas Ulm, Kailua, HI (US); Jonathan Wallen, San Francisco, CA (US); Maddyson Jeske, Hilo, HI (US); Krishnakumar Rajagopalan, Honolulu, HI (US)

(73) Assignee: Hawaii Ocean Power Solutions LLC, Kailua, HI (US)

( * ) Notice: Subject to any disclaimer, the term of this patent is extended or adjusted under 35 U.S.C. 154(b) by 0 days.

(21) Appl. No.: 18/071,158

(22) Filed: Nov. 29, 2022

(65) Prior Publication Data

US 2023/0257087 A1 Aug. 17, 2023

Related U.S. Application Data

(60) Provisional application No. 63/310,443, filed on Feb. 15, 2022.

(51) Int. Cl.
*B63G 8/00* (2006.01)
*B63C 1/02* (2006.01)
(Continued)

(52) U.S. Cl.
CPC .............. *B63G 8/001* (2013.01); *B63C 1/02* (2013.01); *F03B 13/24* (2013.01);
(Continued)

(58) Field of Classification Search
USPC ......................................................... 114/263
See application file for complete search history.

(56) References Cited

U.S. PATENT DOCUMENTS

| 4,271,668 A | * | 6/1981 | McCormick | .......... F03B 13/142 |
| | | | | 415/908 |
| 7,051,668 B1 | * | 5/2006 | Quinto | .................... B63B 34/10 |
| | | | | 114/263 |

(Continued)

FOREIGN PATENT DOCUMENTS

| CN | 111874194 A | * | 11/2020 | .............. B63B 22/00 |
| CN | 114954843 A | * | 8/2022 | .............. B60L 53/66 |

(Continued)

*Primary Examiner* — Wesley G Harris
(74) *Attorney, Agent, or Firm* — Keri Ann K. S. Krzykowski; Martin E. Hsia

(57) ABSTRACT

A wave energy converter that has waveguides affixed radially around a compression chamber to form wave channels to amplify movement of the surface of the ocean in the compression chamber is positioned a distance above a first heave plate. A dock frame is affixed to the bottom of the first heave plate, with a second heave plate comprising ramps extending radially outward and downward from the dock frame, and lobes extending radially outward from the ramps, so that the lobes define V-shaped dock frame channels between the lobes and the ramps define dock frame slots between the ramps. Charging interfaces are provided at the dock frame slots configured to receive an electrically conductive portion of an autonomous underwater vehicle. The V-shaped dock frame channels guide the autonomous underwater vehicle towards and into the dock frame slots, so that the electrically conductive portion is received by a charging interface for charging and communicating with the autonomous underwater vehicle.

9 Claims, 11 Drawing Sheets

(51) Int. Cl.
*F03B 13/24* (2006.01)
*B63B 35/44* (2006.01)

(52) U.S. Cl.
CPC ............... *B63B 2035/4466* (2013.01); *B63G 2008/004* (2013.01); *B63G 2008/008* (2013.01); *F05B 2220/706* (2013.01); *F05B 2240/93* (2013.01); *Y02E 10/30* (2013.01)

(56) References Cited

U.S. PATENT DOCUMENTS

| | | | | |
|---|---|---|---|---|
| 7,410,395 | B2* | 8/2008 | Kawai | B63H 21/17 |
| | | | | 114/259 |
| 9,718,524 | B2* | 8/2017 | Gasparoni | B63C 11/42 |
| 10,669,000 | B2* | 6/2020 | Mahmoudian | B63G 8/001 |
| 2008/0012344 | A1* | 1/2008 | Buffard | F03B 13/20 |
| | | | | 417/258 |
| 2019/0353139 | A1* | 11/2019 | Sheldon-Coulson | |
| | | | | F03B 13/142 |
| 2022/0403812 | A1* | 12/2022 | Browne | B63G 8/001 |

FOREIGN PATENT DOCUMENTS

| | | | | | |
|---|---|---|---|---|---|
| EP | 2471707 | A2 | * | 7/2012 | ............ B63G 8/001 |
| JP | 2017071266 | A | * | 4/2017 | ............ B63C 11/00 |
| KR | 20160137889 | A | * | 12/2016 | ............ B63G 7/00 |
| KR | 20230071387 | A | * | 5/2023 | ............ B64F 1/00 |
| WO | WO-2017054796 | A1 | * | 4/2017 | ............ B63G 8/001 |

* cited by examiner

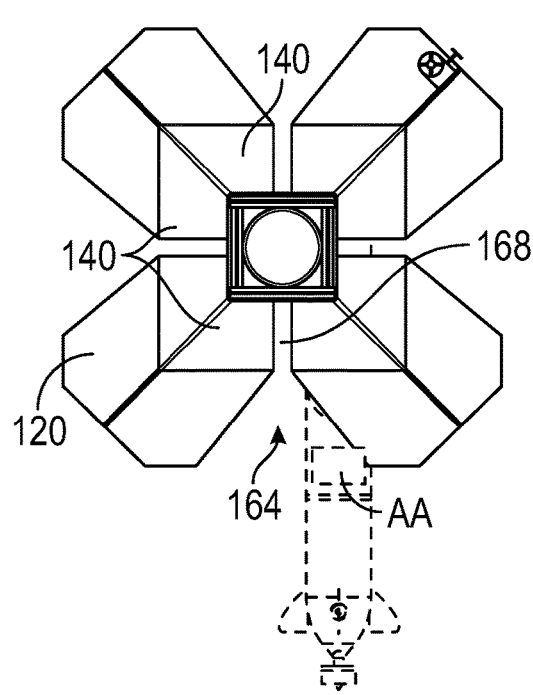 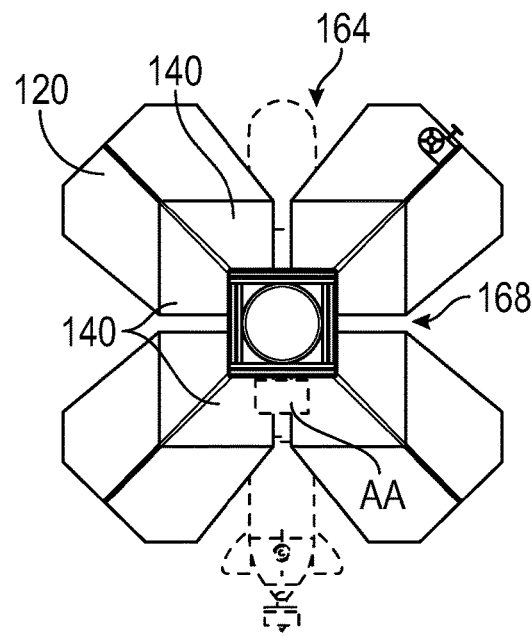
FIG. 8A  FIG. 8B
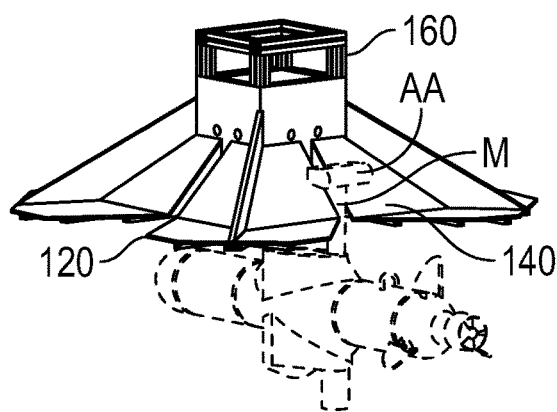 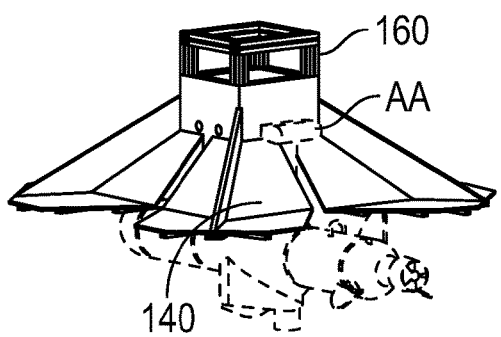
FIG. 8C  FIG. 8D

INTEGRATED WAVE ENERGY CONVERTER AND DOCKING STATION WITH RAMPED CLOVERLEAF SUPPLEMENTAL HEAVE PLATE

This application claims the priority of U.S. provisional patent application No. 63/310,443 filed Feb. 15, 2022.

TECHNICAL FIELD

This invention generally relates to wave-powered autonomous ocean observation systems, specifically systems where the primary electronics are powered via the conversion of ocean wave energy into electrical energy.

BACKGROUND ART

Wave-powered autonomous ocean observation systems are a way to improve the current methods of ocean observation. Current methods are limited in their ability to have high resolution data in both the temporal and spatial sense. These methods are limited by the availability of power at sea, and thus producing power on-site with a wave-powered autonomous ocean observation system allows for increased observing capability.

Prior art ocean wave-powered autonomous ocean observation systems generally disclose the concept of providing mobile charging stations that are powered by wave energy converter (WEC) buoys for powering autonomous underwater vehicles (AUV). In the prior art, these systems are composed of two bodies that are typically connected via a cable. The first body is the WEC, which is a buoy that converts the kinetic energy of an ocean wave into electrical energy. The second body is an AUV docking and charging device (an AUV docking station) that has a charging interface, such as a surface or a port, that is configured to receive an electrically conductive portion of an AUV (such as a mast or prongs on the AUV) and then transmits and receives data, and transmits power, to the AUV through that electrically conductive portion. Separating the WEC from the AUV docking station decouples the motion between the docking device and the WEC. The desired motion to safely dock an AUV typically does not match the motion needed for the WEC to efficiently capture wave energy.

The prior art discloses a number of different wave energy converter (WEC) buoys. Fundamentally, a WEC converts the relative motion between two objects into electrical energy through a "power take off" generator (PTO). A PTO is a system of components that convert mechanical energy into electrical energy. One example of this is called an oscillating water column (OWC) type WEC, where the relative motion is between a floating body and a water surface. In previous OWC type WECs, the mechanical energy of an ocean wave is used to compress an enclosed pocket of air into a spinning turbine type PTO. This PTO functions by first converting the kinetic energy of moving air into mechanical energy of a spinning turbine, and finally converting the mechanical energy of the turbine into electrical energy through a generator. The electrical energy is thereafter immediately used or stored in batteries.

The prior art describes multiple forms of oscillating water column (OWC) type WECs. One form of OWC is called a Spar OWC. Previous spar OWCs are described as long straight hollow tubes with one end above the water surface that is partially enclosed. The spar OWC uses its relative motion in the vertical direction relative to the wave in order to compress trapped air in a central compression chamber. The primary mode of operation is in the vertical direction, but motion in other directions can affect the amount of wave energy converted. The spar OWC's power capture (i.e. its ability to convert wave energy into electrical energy and power) is directly related to the frequency and phase of the spar OWC's motion relative to the frequency and phase of the wave. The spar OWC's power capture is the greatest when the spar is completely out of phase with the wave.

How a wave energy converter buoy (WEC) functions is affected by how it responds to different wavelengths of waves. The wavelength is inversely related to the frequency of the wave. The motion response of the WEC is determined by the resonant frequency of the WEC. Resonant frequencies are frequencies at which the response amplitude is a relative maximum. For a spar OWC WEC, the resonant frequency is determined by the geometry of the submerged or wetted parts of the buoy and the total mass of the buoy (both added mass and dry mass).

A prior art device disclosed more than a year ago by the inventors disclosed a variation of the simple spar OWC, where vertical channeling waveguides (panels) are affixed to a central long hollow tube (compression chamber) to form V-shaped channels (see FIGS. 1, 1A, and 1B). The V-shaped channels increase the horizontal width of this spar OWC WEC in order to increase the amount of power captured and to focus the wave energy into the central long hollow tube. This amplifies the relative vertical motion of the water surface. In this variation, a single horizontal circular disk is attached to the bottom, and functions as a "heave plate". Heave plates contribute added stability to a submerged structure. They increase the "added mass" of the structure and damp the structure's horizontal motion (motion coplanar with the heave plate). In fluid mechanics, "added mass" is the inertia added to a system because an accelerating or decelerating body must move (or deflect) some volume of surrounding fluid as it moves through it. Thus, the "added mass" is the mass of the water that must be displaced for a submerged object to move.

The principle of the prior art device is disclosed in FIG. 1, showing an ocean current, where the bottom of the compression chamber extends to the circular heave plate, showing an AUV approaching for docking. FIG. 1A is a perspective view of a prior art spar OWC WEC where there are openings between the bottom of the compression chamber and the circular heave plate, showing an AUV docked. FIG. 1B is a perspective view of the upper portion of the prior art spar OWC WEC.

The prior art device (described above) contained a central long hollow tube (compression chamber) that extended down to the circular heave plate, but had two openings in the compression chamber opposite each other, near the heave plate and between the waveguides, where the compression chamber did not extend all the way down to the circular heave plate (compare FIG. 1 showing one side where the compression chamber extends down to the heave plate and FIG. 1A showing another side that contains an opening between the compression chamber and the circular heave plate). These openings allowed waves to enter the chamber only from certain directions. By not extending all of the compression chamber down to the circular heave plate, and having openings on opposite sides of the compression chamber and between waveguides, the prior art device was able to prevent lateral spreading of the wave once it entered the compression chamber, and thus prevented incident wave energy from escaping out the sides of the WEC. This allowed the prior art device to capture wave energy at a higher efficiency for waves coming from a constrained set of directions. This design feature is advantageous and desirable for WECs that are fixed to a geographic region where the direction of wave propagation is predictable such that the device can be oriented so that waves travel toward the openings in the compression chamber between waveguides for maximum wave energy extraction. This feature is not as useful in open ocean and other settings where the device is not fixed or tethered to a specific location, because the direction of wave propagation may not be known or predictable.

The prior art device (described above) is an autonomous ocean observation system having two independent bodies: the WEC and a suspended docking interface (AUV docking station). The WEC and AUV docking station are connected by a cable. The cable is prone to failure if not properly managed, which can result in the loss of the AUV and the AUV docking station. A tether management system is needed to prevent the relative motion between the WEC and the AUV docking station from kinking or breaking the cable by subjecting the cable to snap loads. Snap loads are spikes in tension along cable as it engages from a previous slack condition, which can weaken the cable and cause it to break. The AUV and other debris also have a risk of colliding with the cable and becoming entangled.

Prior art AUV docking stations disclose numerous methods of interfacing an AUV with a docking interface (usually a charging surface or a charging port). The geometry of the docking station depends on the location, charging interface, and type of AUV. The prior art discloses seabed mounted docking stations, mid-water suspended docking stations, and above surface docking stations. For charging interfaces, the prior art discloses contact and non-contact charging interfaces for torpedo-type AUVs. For both types of charging interfaces, a seabed mounted V-shaped channel dock has been described.

Prior art describes a buoy where the dry mass (i.e. the mass of the buoy on land with all water removed) requires the use of a crane to safely lift and deploy the wave energy converter (WEC). Limited access to a crane or other appropriate lifting equipment can restrict and limit how and when WECs can be used and applied. In the most remote areas, end users may only have access to municipal piers and small fishing vessels without access to lifting equipment such as cranes. Changing the materials used for certain structures can reduce the dry mass of the WEC such that the WEC can be safely lifted and deployed by two people without a crane. However, in order to maintain the same resonant frequency for the WEC, the total mass of the WEC (both added mass (i.e. the mass of the water that must be displaced for a submerged structure to move) and dry mass) must stay the same. Thus, the added mass must be increased.

DISCLOSURE OF INVENTION

The presently preferred embodiment of the invention preferably comprises a compact and rapidly manually deployable integrated single body WEC and AUV docking station. The WEC is preferably a spar oscillating water column (OWC) WEC with V-shaped channels and a first heave plate, preferably a circular heave plate as described in the prior art, but it also preferably comprises the following design features that are new, useful and not disclosed or suggested by the prior art:

1. The Addition of a Second Heave Plate to Reduce the Dry Mass of the Present Invention so it is Rapidly Manually Deployable by Two People Without the Use of a Crane The inclusion of a second heave plate that is preferably affixed to, and located below, the first circular heave plate can significantly increase the added mass.

2. An Attached AUV Docking Station Comprised of a Ramped Cloverleaf Heave Plate with Truncated Leaflets or Lobes ("Cloverleaf Heave Plate") that Form V-Shaped Dock Frame Channels and Dock Frame Slots The second heave plate (described above) is preferably a ramped quasi four-leaf clover shaped heave plate ("Cloverleaf Heave Plate"). The Cloverleaf Heave Plate preferably has four truncated leaflets or lobes, each of which is attached to, and extends outwardly from, one of four ramps (a "dock ramp") in a cross shaped configuration, connected to a dock frame. The spacing between the four leaflets or lobes creates (a) four V-shaped channels between the leaflets or lobes ("V-shaped dock frame channels") leading to (b) four slots ("dock frame slots") between the ramps, to receive the mast of a torpedo-type AUV. See FIG. 2b (below). Each V-shaped dock frame channel allows the mast on an AUV ("AUV mast"), preferably with an antenna array on top, to be guided towards a dock frame slot as the AUV approaches for docking to the WEC. The dock frame slot guides the AUV mast toward the dock frame, where electromagnets secure the AUV, preferably below the antenna array. The four V-shaped dock frame channels are preferably angularly arranged around the dock frame to allow the AUV to approach and dock from any direction. Just as the V-shaped dock frame channels guide the AUV mast into the dock frame slots to dock despite horizontal displacement or movement, the dock ramps guide the AUV mast to dock despite vertical displacement or movement, to solve the problem of docking the AUV mast to a small area.

3. Single Body WEC with Integrated AUV Docking Station

With the integration of the AUV docking station into the WEC, the WEC can function as a single body system, to remove any entanglement or other risks caused by using cables. The prior art discloses a separate AUV docking station (with a docking interface) connected to the WEC through cables, to which AUVs can dock, where the motion between the two bodies (the WEC and the AUV docking station) is coupled, but the motion is not exactly the same. The AUV docking station of the present invention allows docking to occur at the WEC that is producing power, by integrating the geometry of the AUV docking station with the design of the WEC. By eliminating the need for a cable and a separate docking interface, the integral single body WEC with AUV docking station has a single motion profile that is not coupled (tied) to the motion of other bodies. This simplified system eliminates the need for an additional control system to manage the cable.

4. Omnidirectional Power Performance

The geometry of the prior art device was changed to allow the present invention to capture wave energy from any and all directions, not just a constrained set of directions. By raising the entire compression chamber a distance above the heave plate, an opening is created under the compression chamber between waveguides on all sides of the device. Although this causes the device to have a lower efficiency in extracting power, the device is able to capture wave energy from all directions. This can be beneficial for consistently producing power on the open ocean where wave propagation is unknown or unpredictable. Thus, the ability to capture wave energy omnidirectionally allows the present invention to prioritize the ability to consistently produce power production, over the ability to maximize power production.

Accordingly, a first presently preferred embodiment of the invention comprises a wave-powered docking station having a dry mass, for charging and communicating with an autonomous underwater vehicle that has an electrically conductive portion. A cylindrical compression chamber has an interior, a submerged open end and an exposed closed end, so that when the submerged open end is submerged in the ocean, trapped air is enclosed in the interior of the compression chamber between the exposed closed end and the surface of said ocean. A power take off generator is attached to the compression chamber and in fluid communication with the trapped air when the submerged open end is submerged in said water. Waveguides, having chamber edges, top edges and bottom edges, are affixed radially around the compression chamber at the chamber edges and extend below the submerged open end, forming wave channels between the waveguides leading to the open end of compression chamber. In this manner, the wave channels direct wind waves having wave energy from any direction toward the compression chamber and the wave channels amplify movement of the surface of the ocean in the compression chamber. A first heave plate having a top surface and a bottom surface is affixed so that the submerged end of the compression chamber is positioned a distance above the top surface of the first heave plate, so that the wave channels direct wind waves from any direction towards the compression chamber for consistent capturing of a portion of the wave energy. A dock frame is affixed to the bottom surface of the first heave plate containing a housing for electronics to assist with docking of the autonomous underwater vehicle. A second heave plate comprising ramps having dock ends and lobe ends, is attached to the dock frame at the dock ends, and radiating outward from the dock frame, defining dock frame slots having channel ends and frame ends between each of the ramps, extending radially outward from the dock frame. Truncated oblong lobes having tip ends and ramp ends are attached to the ramps at the ramp ends and define V-shaped dock frame channels between each of the lobes, extending radially outward from the dock frame. Charging interfaces at the frame ends of the dock frame slots are configured to receive the electrically conductive portions of the autonomous underwater vehicles. When the wave-powered docking station is submerged in the ocean, wind waves from any direction are directed by the waveguides towards the compression chamber and force the surface of the ocean to move vertically in the compression chamber so that the trapped air is pushed through the power take off generator, generating power which can be used to charge the autonomous underwater vehicle. Also, when the autonomous underwater vehicle approaches the docking station, the V-shaped dock frame channels guide the autonomous underwater vehicle toward and into the dock frame slots, so that the electrically conductive portion is received by the charging interfaces for charging and communicating with the autonomous underwater vehicle.

In another preferred embodiment, the invention comprises a wave-powered docking station having a dry mass, for charging and communicating with an autonomous underwater vehicle, said vehicle having an electrically conductive portion. The docking station has a cylindrical compression chamber with an interior, a submerged open end, an exposed closed end and at least two diametrically opposed openings in the compression chamber at the submerged end, so that when the submerged open end is submerged in the ocean, trapped air is enclosed in the interior of the compression chamber between the exposed closed end and the surface of said ocean. A power take off generator is attached to the compression chamber and in fluid communication with the trapped air when the submerged end is submerged in the water. Waveguides, having chamber edges, top edges and bottom edges, are attached by the chamber edges to the chamber, at least one on each side of the diametrically opposed openings, extending radially outward from the chamber, forming wave channels between the waveguides on each side of the diametrically opposed openings leading to the compression chamber. In this manner, the wave channels direct waves having wave energy from a constrained set of directions aligned with the diametrically opposed openings toward the compression chamber and the wave channels, to amplify vertical movement of said surface of the ocean in the compression chamber. A first heave plate having a top surface and a bottom surface is affixed to the compression chamber so that the submerged end of the compression chamber is positioned a distance above the top surface of the first heave plate at the diametrically opposed openings, so that the wave channels direct the waves from the constrained set of directions towards the compression chamber for maximizing capturing of the wave energy from the constrained set of directions. A dock frame is affixed to the bottom surface of the first heave plate containing a housing for electronics to assist with docking of said autonomous underwater vehicle. A second heave plate comprises ramps having dock ends and lobe ends attached to the dock frame at the dock ends, and radiating outward from the dock frame, defining dock frame slots having channel ends and frame ends between each of the ramps, extending radially outward from the dock frame. Truncated oblong lobes having tip ends and ramp ends are attached to the ramps at the ramp ends and define V-shaped dock frame channels between each of the lobes, extending radially outward from the dock frame. Charging interfaces at the frame ends of the dock frame slots are configured to receive the electrically conductive portions of the autonomous underwater vehicles. In this manner, when the wave-powered docking station is submerged in the ocean, the waves having wave energy from a constrained set of directions are directed by the waveguides towards the compression chamber and force the surface of the ocean to move vertically in the compression chamber so that the trapped air is pushed through the power take off generator, generating power which can be used to charge the autonomous underwater vehicle. When the autonomous underwater vehicle approaches the docking station, the V-shaped dock frame channels guide the autonomous underwater vehicle toward and into the dock frame slots, so that the electrically conductive portion is received by the charging interfaces for charging and communicating with the autonomous underwater vehicle.

In another presently preferred embodiment, the invention comprises a wave-powered docking station having a dry mass, for charging and communicating with an autonomous underwater vehicle, said vehicle having an electrically conductive portion. The docking station has a cylindrical compression chamber with an interior, a submerged open end, an exposed closed end and at least two diametrically opposed openings in the compression chamber at the submerged end, so that when the submerged open end is submerged in the ocean, trapped air is enclosed in the interior of the compression chamber between the exposed closed end and the surface of the ocean. A power take off generator is attached to the compression chamber and in fluid communication with the trapped air when the submerged end is submerged in the water. Waveguides, having chamber edges, top edges and bottom edges, are attached at the chamber edges to the chamber, at least one on each side of the diametrically opposed openings, extending radially outward from the chamber, forming wave channels between the waveguides on each side of the diametrically opposed openings leading to said compression chamber. In this manner, the wave channels direct waves having wave energy from a constrained set of directions aligned with the diametrically opposed openings towards the compression chamber and the wave channels amplify vertical movement of the surface of the ocean in the compression chamber. A first heave plate having a top surface and a bottom surface is affixed to the compression chamber so that the submerged end of the compression chamber is positioned a distance above the top surface of the first heave plate at the diametrically opposed openings, whereby the wave channels direct the waves from the constrained set of directions towards the compression chamber for maximizing capturing of the wave energy from a constrained set of directions. The improvement comprises a dock frame affixed to the bottom surface of the first heave plate containing a housing for electronics to assist with docking of the autonomous underwater vehicle, and a second heave plate comprising ramps having dock ends and lobe ends, attached to the dock frame at the dock ends, and radiating outward from the dock frame, defining dock frame slots having channel ends and frame ends between each of the ramps, extending radially outward from the dock frame. Truncated oblong lobes having tip ends and ramp ends are attached to the ramps at the ramp ends and define V-shaped dock frame channels between each of the lobes, extending radially outward from the dock frame. Charging interfaces at the frame ends of the dock frame slots are configured to receive the electrically conductive portions of the autonomous underwater vehicles. In this manner, when the wave-powered docking station is submerged in the ocean, the waves having wave energy from a constrained set of directions are directed by the waveguides toward the compression chamber and force the surface of the ocean to move vertically in the compression chamber so that the trapped air is pushed through the power take off generator, generating power which can be used to charge the autonomous underwater vehicle. When the autonomous underwater vehicle approaches the docking station, the V-shaped dock frame channels guide the autonomous underwater vehicle toward and into the dock frame slots, whereby the electrically conductive portion is received by the charging interfaces for charging and communicating with the autonomous underwater vehicle.

In other presently preferred embodiments, the invention comprises a wave-powered docking station as described above, wherein the dry mass is preferably between 100 kg to 500 kg, and optimally between 100 kg to 209 kg.

In other presently preferred embodiments, the invention comprises a wave-powered docking station as described above, in which the distance above the first heave plate is operably between 13 inches and 16 inches.

In other presently preferred embodiments, the invention comprises a wave-powered docking station as described above, further comprising batteries operably connected to the power take off generator for storing said power.

In other presently preferred embodiments, the invention comprises a wave-powered docking station as described above, wherein the power take off generator is chosen from the group consisting of bi-directional impulse turbines, wells turbines, and flexible piezoelectric devices.

In other presently preferred embodiments, the invention comprises a wave-powered docking station as described above, further comprising propulsive devices inlaid in the waveguides for increasing mobility of the wave-powered docking station.

BRIEF DESCRIPTION OF DRAWINGS

FIG. 8A shows a top plan view of an AUV approaching to dock with the cloverleaf heave plate.

FIG. 8B shows a top plan view of an AUV docked with the cloverleaf heave plate.

FIG. 8C shows a perspective view from the side of an AUV approaching to dock with the cloverleaf heave plate.

FIG. 8D shows a perspective view from the side of an AUV docked with the cloverleaf heave plate.

BEST MODES FOR CARRYING OUT INVENTION

The presently preferred best modes of the present invention are disclosed below in connection with the appended drawings.

Figure 1:
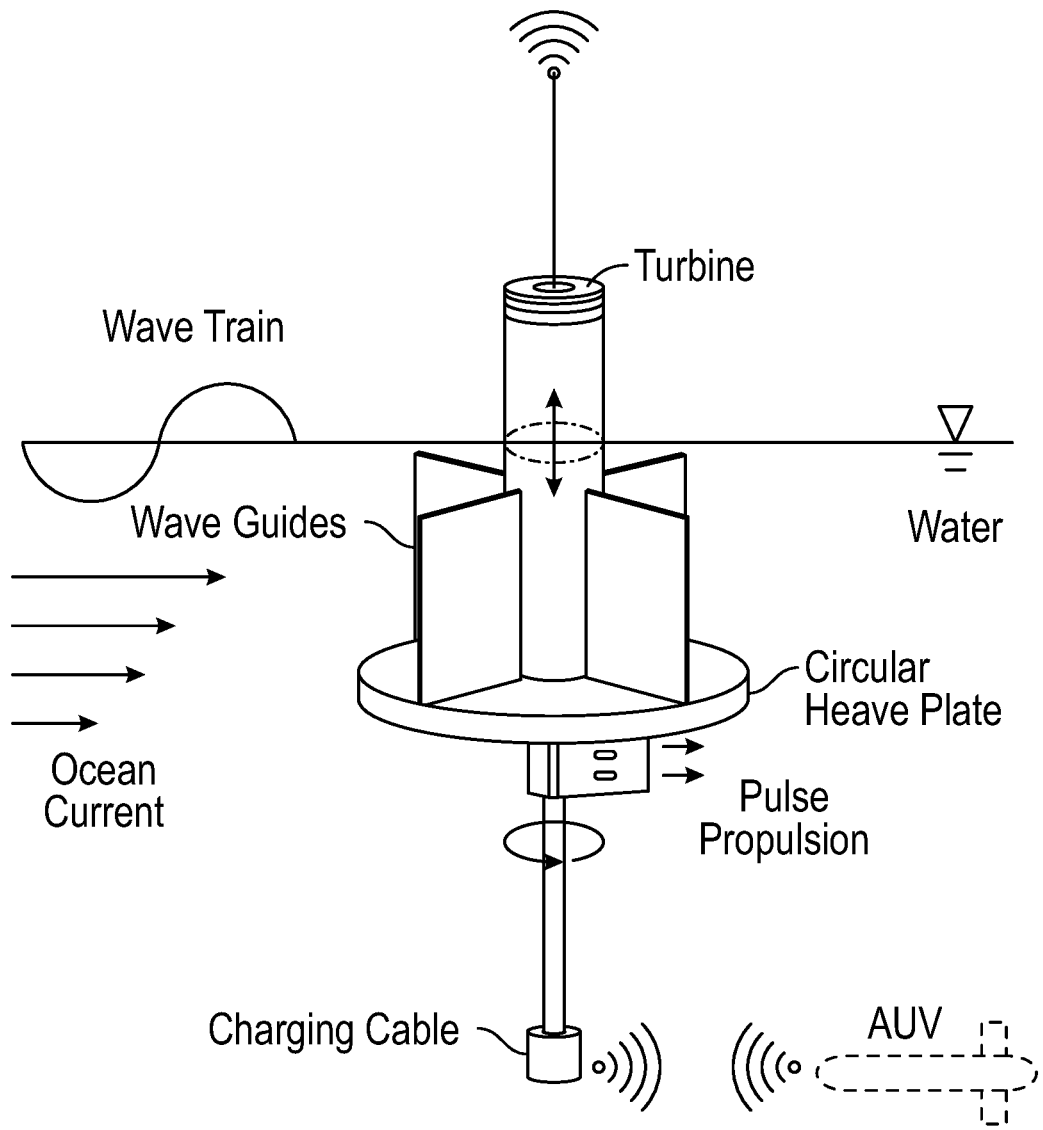
FIG. 1 is a schematic perspective view of a prior art OWC WEC showing an ocean current, where the bottom of the compression chamber extends to the circular heave plate, showing a AUV approaching for docking.
Figure 1A:
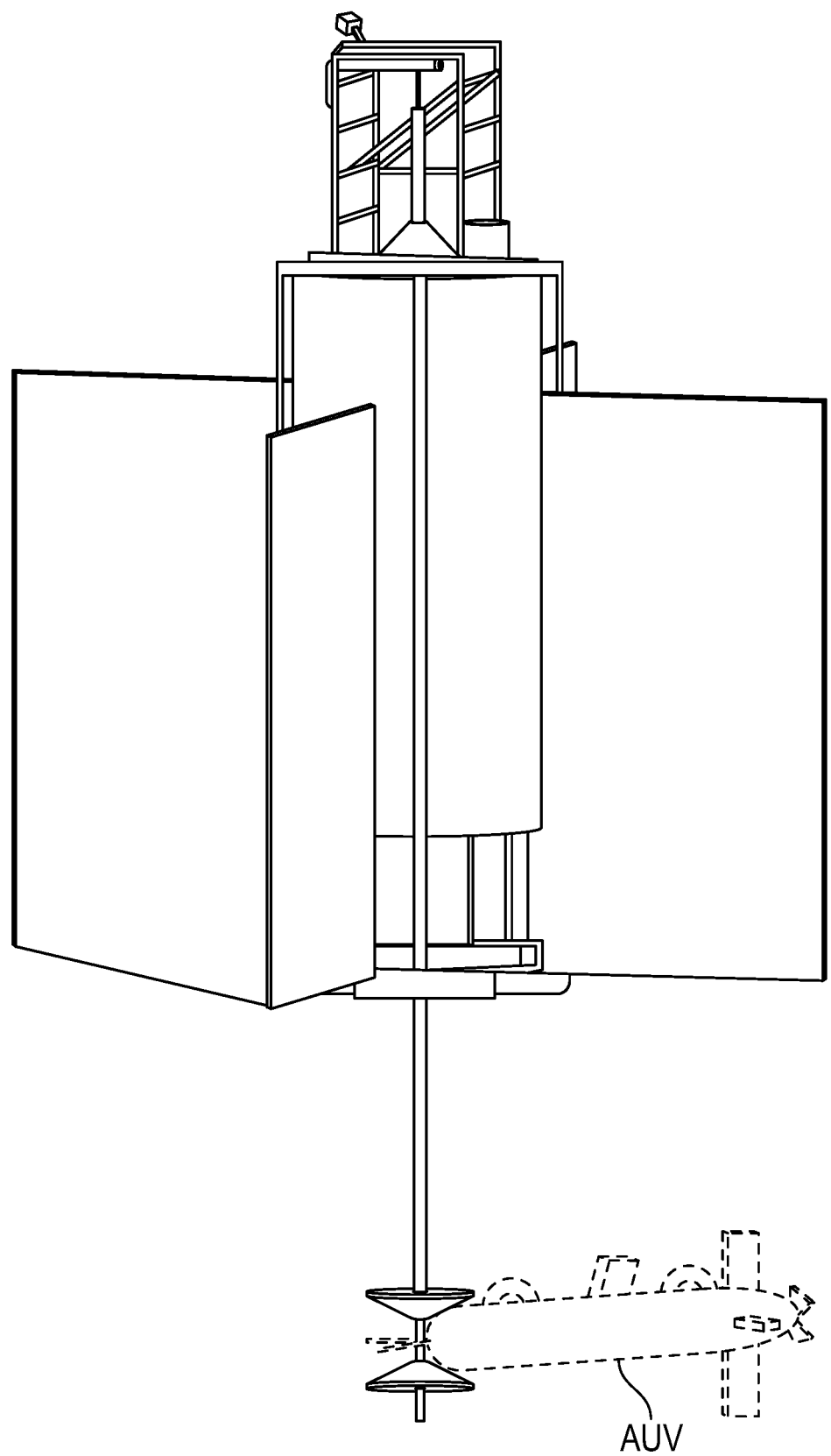
FIG. 1A is a perspective view of a prior art spar OWC WEC where there are openings between the bottom of the compression chamber and the circular heave plate, showing a AUV docked.
Figure 1B:
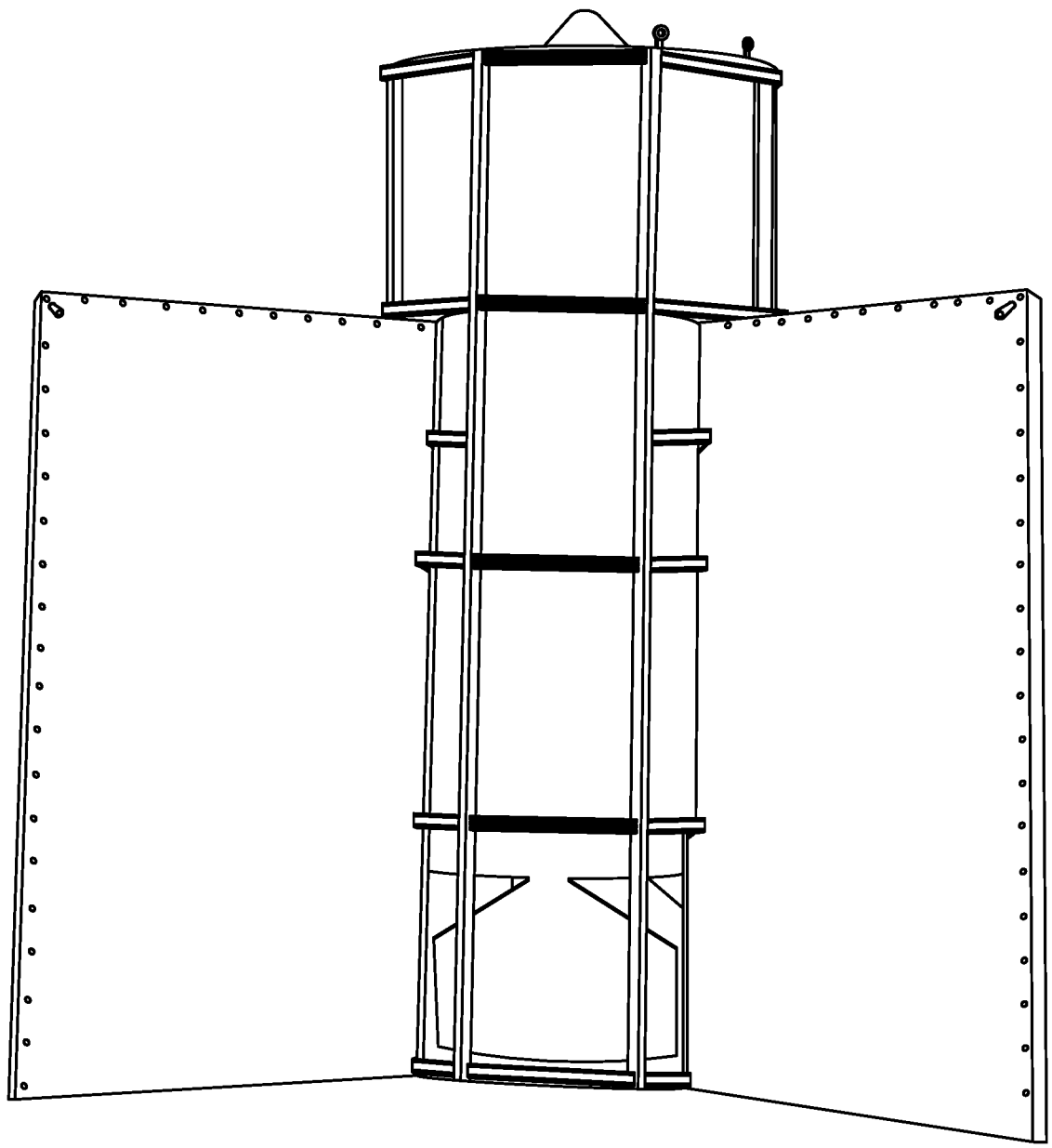
FIG. 1B is a perspective view of the upper portion of the prior art spar OWC WEC.
Figure 2A:
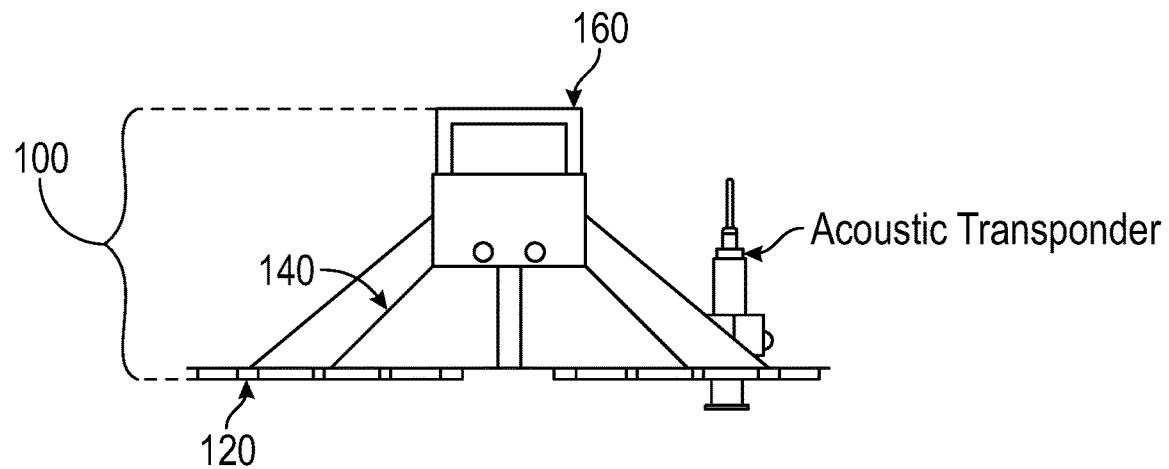
FIG. 2A is a side elevational schematic view of a cloverleaf heave plate with ramps and leaflets or lobes according to a presently preferred embodiment of the present invention.

Referring to FIG. 2A, shown is a side elevational schematic view of a cloverleaf heave plate 100 having four flat truncated leaflets or lobes 120, each attached at one end to a dock ramp 140 or a central dock frame 160. The ramps 140 further are connected to the leaflets or lobes 120 or central dock frame 160. Preferably, the dock frame 160 is square or rectangular.

Figure 2B:
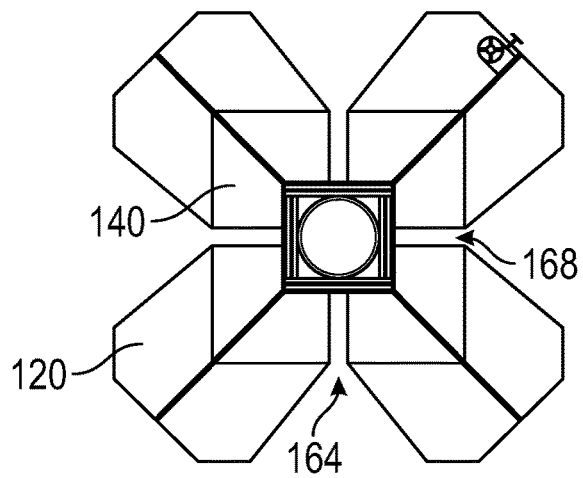
FIG. 2B is a top plan view of the embodiment of FIG. 2A.

FIG. 2B is a top plan view of the embodiment of FIG. 2A. As can be seen, adjacent leaflets or lobes 120 define between them V-shaped dock frame channels 164 leading to dock frame slots 168 leading to the dock frame 160.

Figure 2C:
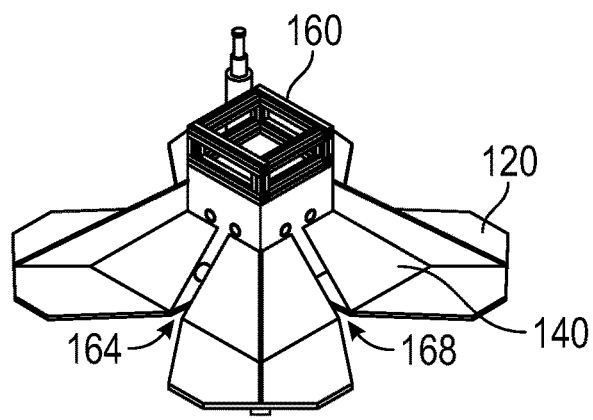
FIG. 2C is a perspective view from above of the embodiment of FIG. 2A.

FIG. 2C is a perspective view from above of the embodiment of FIG. 2A.

Figure 2D:
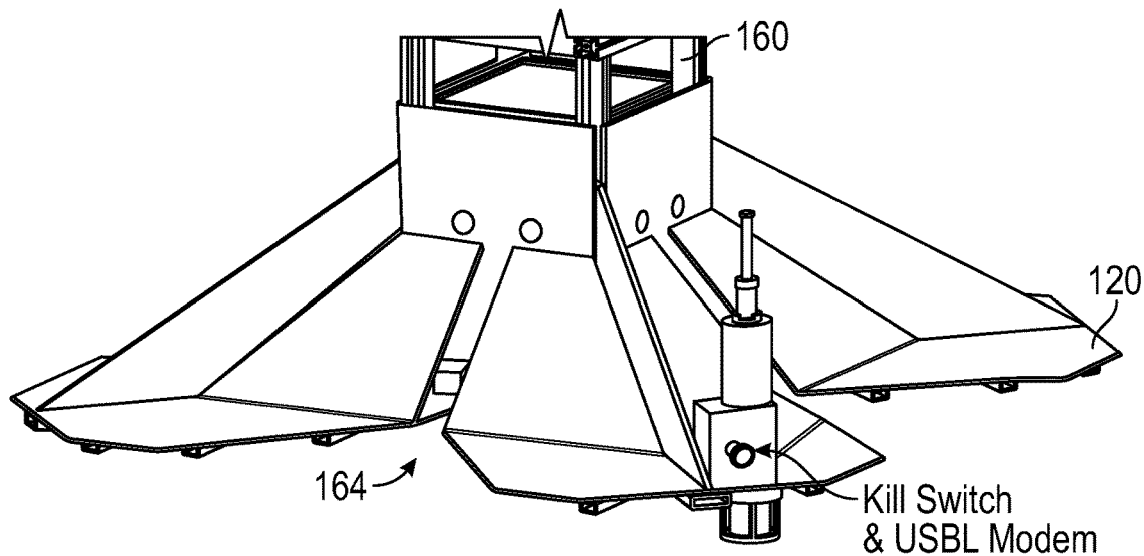
FIG. 2D is a perspective view from above of the embodiment of FIG. 2A.

FIG. 2D is a perspective view from above of the lower portion of the embodiment of FIG. 2A.

Figure 2E:
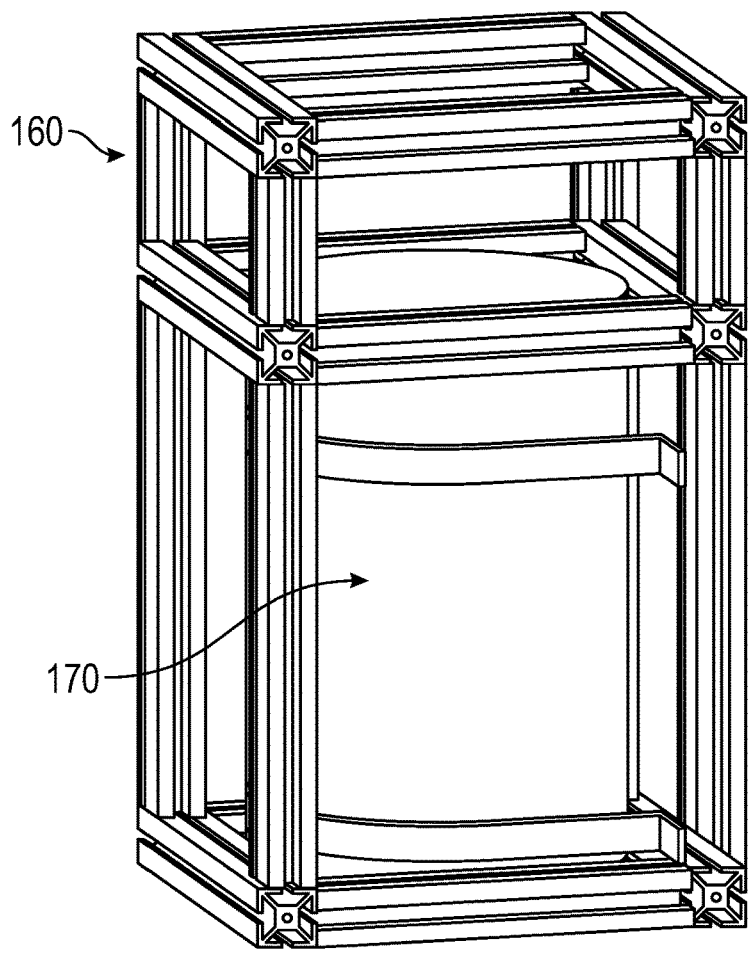
FIG. 2E is a perspective view from above of the embodiment of FIG. 2A with the ramped cloverleaf removed to show the lower portion of the dock frame 2A.

FIG. 2E is a perspective view of the dock frame 160 of the embodiment of FIG. 2A, with the leaflets or lobes 120 and ramps 140 omitted, to show, inside the dock frame 160, a cylindrical housing 170 for electronics (WEC electronics) to assist with AUV docking. The WEC electronics preferably include optical communication, inductive chargers, batteries, and other relevant and similar WEC electronics.

Figure 3A:
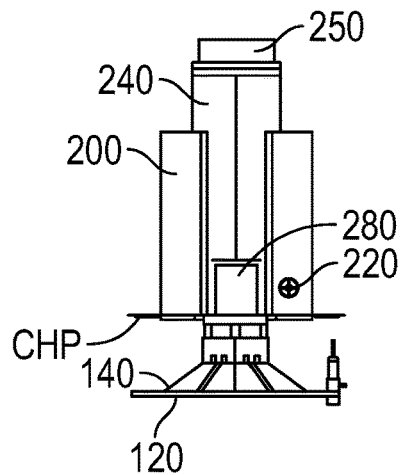
FIG. 3A is a side elevational view of a presently preferred embodiment of the present invention.
Figure 3B:
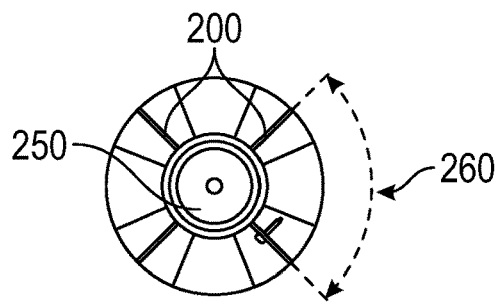
FIG. 3B is a top plan view of the embodiment of FIG. 3A showing V-shaped channels defined by waveguides.
Figure 3C:
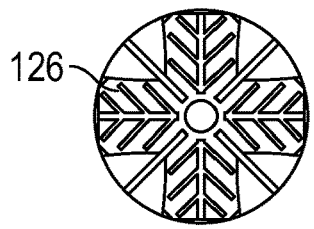
FIG. 3C is a bottom plan view of the embodiment of FIG. 3A.
Figure 3D:
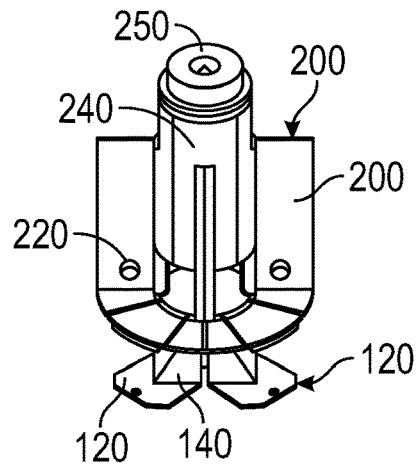
FIG. 3D is a perspective view from above of the embodiment of FIG. 3A.

Referring to FIG. 3A, shown is a side elevational view of a Spar OWC WEC with waveguides 200 with thrusters (propulsive devices) 220. The waveguides 200 protrude every 90 degrees from a central compression chamber 240 of the WEC, forming V-shaped channels ("WEC Wave Channels") 260 between adjacent waveguides 200. The waveguides 200 are attached to a circular heave plate CHP, as known in the prior art. Preferably, there are openings 280 between the circular heave plate CHP, the waveguides 200, and 2 the bottom of the compression chamber 240. A Cloverleaf Heave Plate 100 is attached at the bottom of the WEC. Referring to FIG. 3B, the waveguides 200 protrude every 90 degrees from a central compression chamber 240 of the WEC, forming V-shaped channels ("WEC Wave Channels") 260 between adjacent waveguides 200. As can be seen, the circular heave plate CHP preferably comprises multiple sector-shaped segments. Referring to FIG. 3C, shown are structural support vanes 126 on the underside of the leaflets or lobes 120 of the Cloverleaf Heave Plate.

Figure 4:
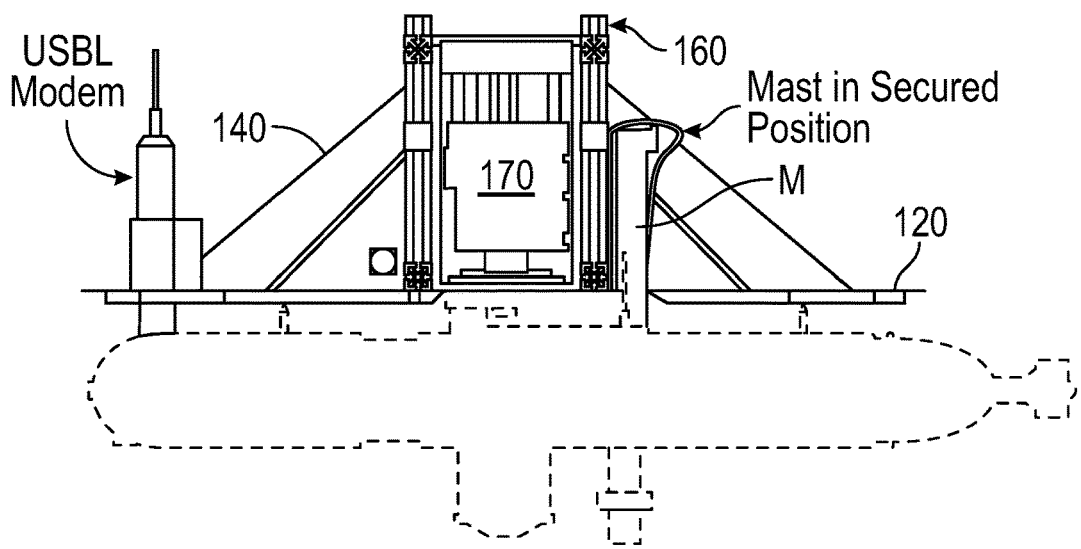
FIG. 4 is a side cross sectional view of a torpedo-type AUV containing a mast docked to the cloverleaf heave plate.

Referring to FIG. 4, shown is a side cross sectional view of a torpedo-type AUV containing a mast M having an antenna array AA docked to the cloverleaf heave plate 100.

Figure 5A:
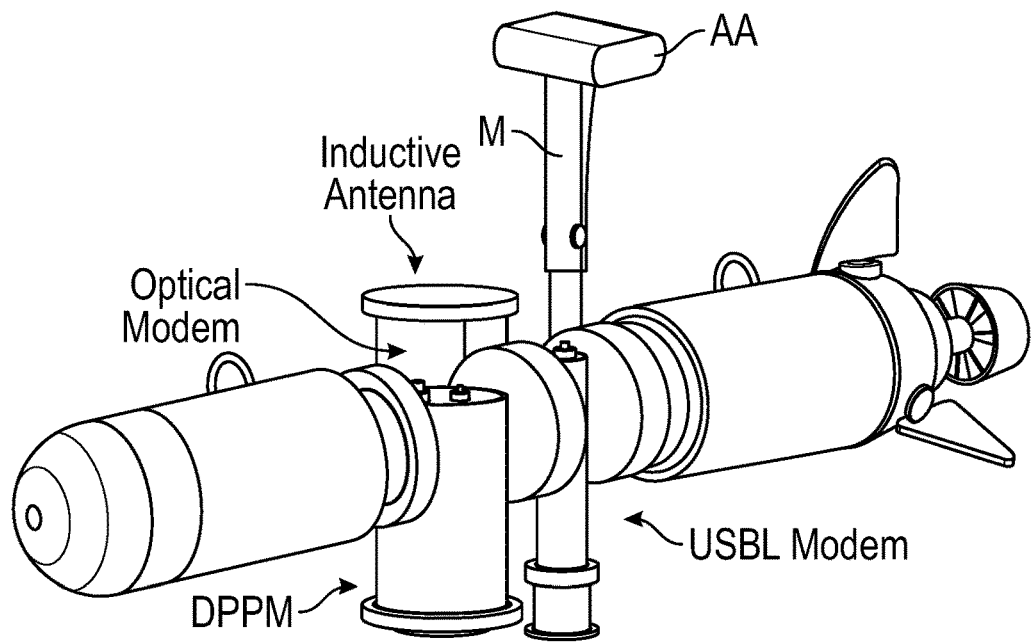
FIG. 5A is a torpedo-type AUV with a mast and antenna array.
Figure 5B:
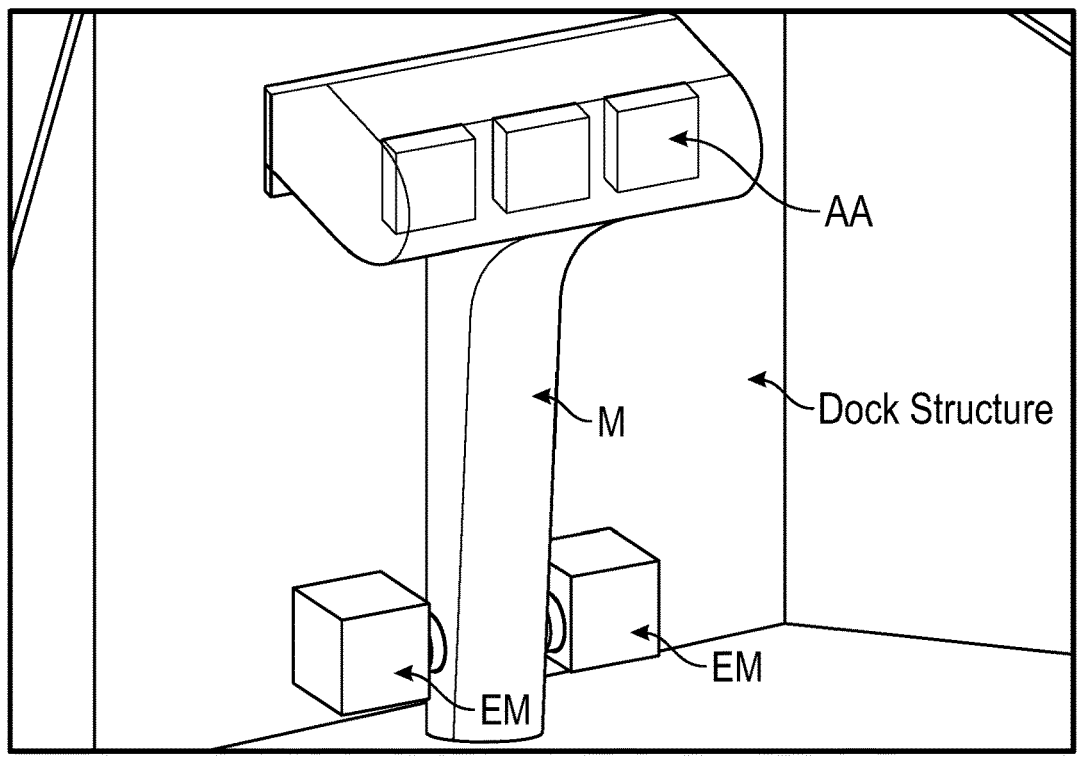
FIG. 5B shows the mast of an AUV docked with an AUV docking station.

Referring to FIG. 5A, shown is a typical torpedo-type AUV, having a mast M with an antenna array AA on top. Referring to FIG. 5B, shown is how the AUV mast M preferably interfaces with, and removably attaches to, at least two electromagnets EM on the dock frame 160. When the AUV is docked, the portion of the mast M below the antenna array AA preferably interfaces with, and removably attaches to, dock electromagnets EM on the dock frame 160 that lock it into place.

Figure 6:
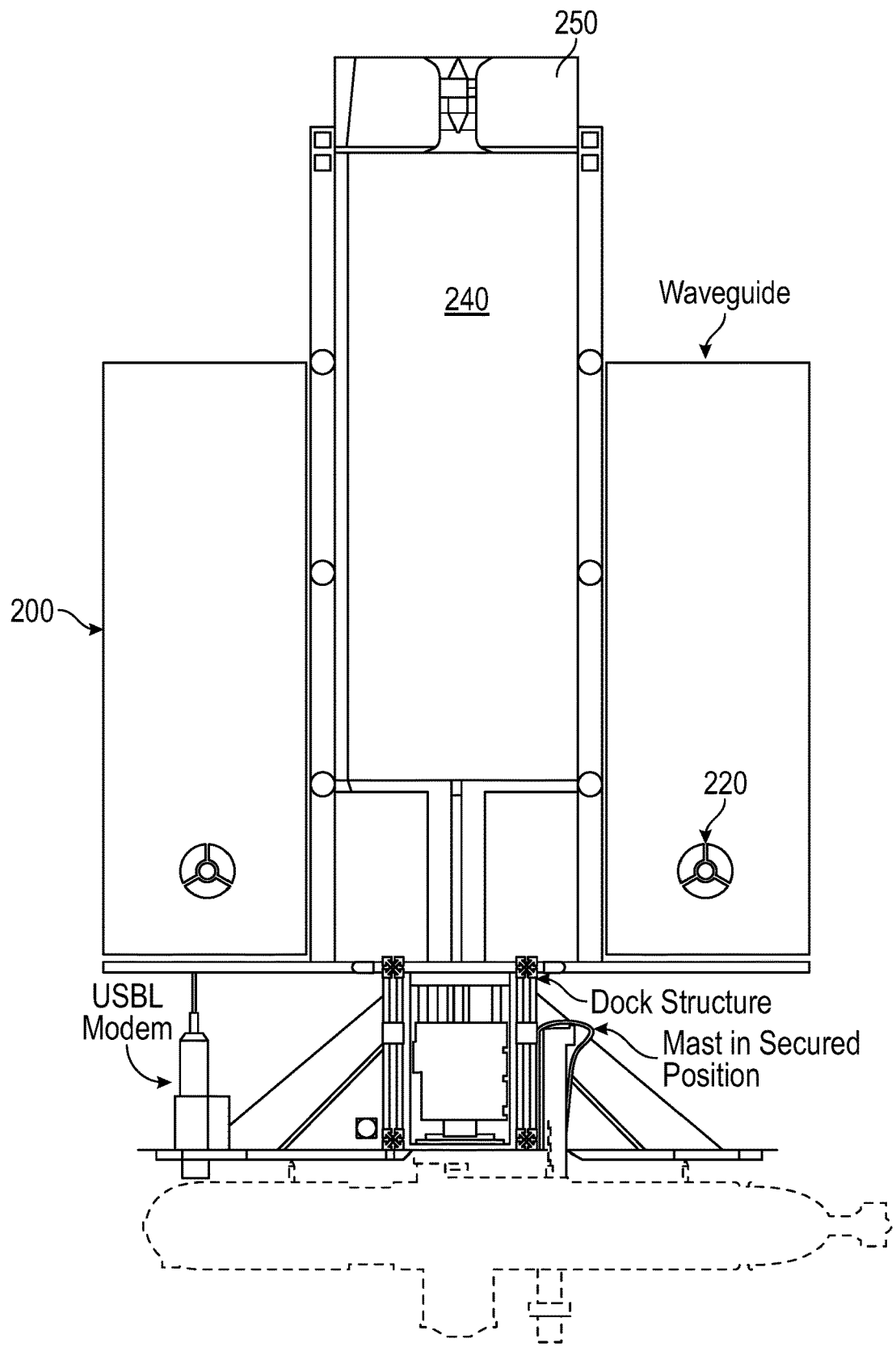
FIG. 6 shows the presently preferred embodiment of a spar OWC WEC with WEC channels, joined to the presently preferred embodiment of the cloverleaf heave plate, with a torpedo-type AUV docked.

Referring to FIG. 6, shown is a presently preferred embodiment of a spar OWC WEC with WEC channels, joined to the presently preferred embodiment of the cloverleaf heave plate, with a torpedo-type AUV docked. The presently preferred WEC preferably contains a compression chamber 240 that is hollow and cylindrical and captures wave energy by using a power take off generator that is preferably a bi-directional flow pneumatic turbine 250.

Figure 6A:
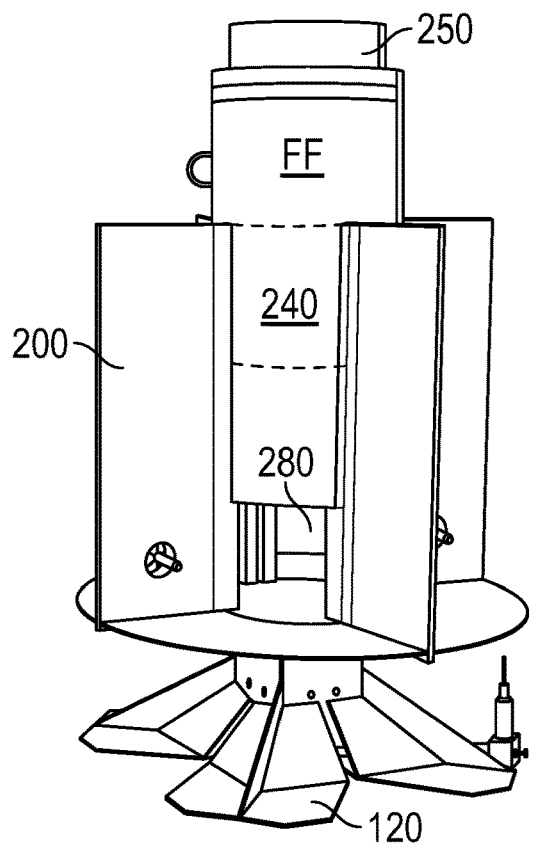
FIG. 6A shows the embodiment of FIG. 6, without the docked AUV.

FIG. 6A shows the embodiment of FIG. 6, without the docked AUV. Preferably, the top of the compression chamber 240 is provided with flotation foam FF.

Figure 6B:
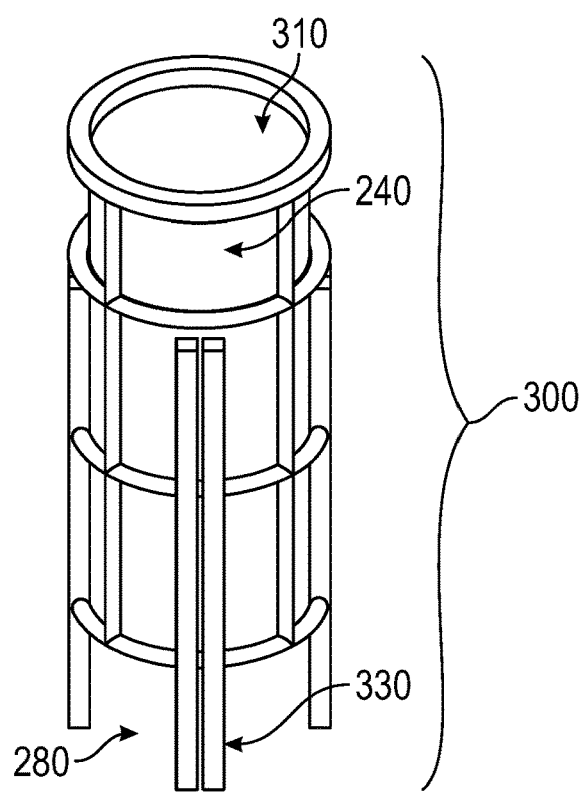
FIG. 6B shows a perspective view of the compression chamber and dock frame, with waveguides and heave plates removed for clarity.

FIG. 6B shows a perspective view of the compression chamber frame 300, which is preferably made of aluminum tube, mounted on the compression chamber 240, with the flotation foam FF, turbine 250, waveguides 200, and a first heave plate, preferably a circular heave plate CHP, removed for clarity. As can be seen, the top of the compression chamber frame 300 is provided with a flange and PTO mounting surface 310, and the sides of the frame 200 are provided with attachment rails 330 to which the waveguides 200 can be attached. The circular heave plate CHP is attached to the bottom of the frame 300, so that there are openings 280 between the circular heave plate CHP, the waveguides 200, and the bottom of the compression chamber 240.

Figure 7:
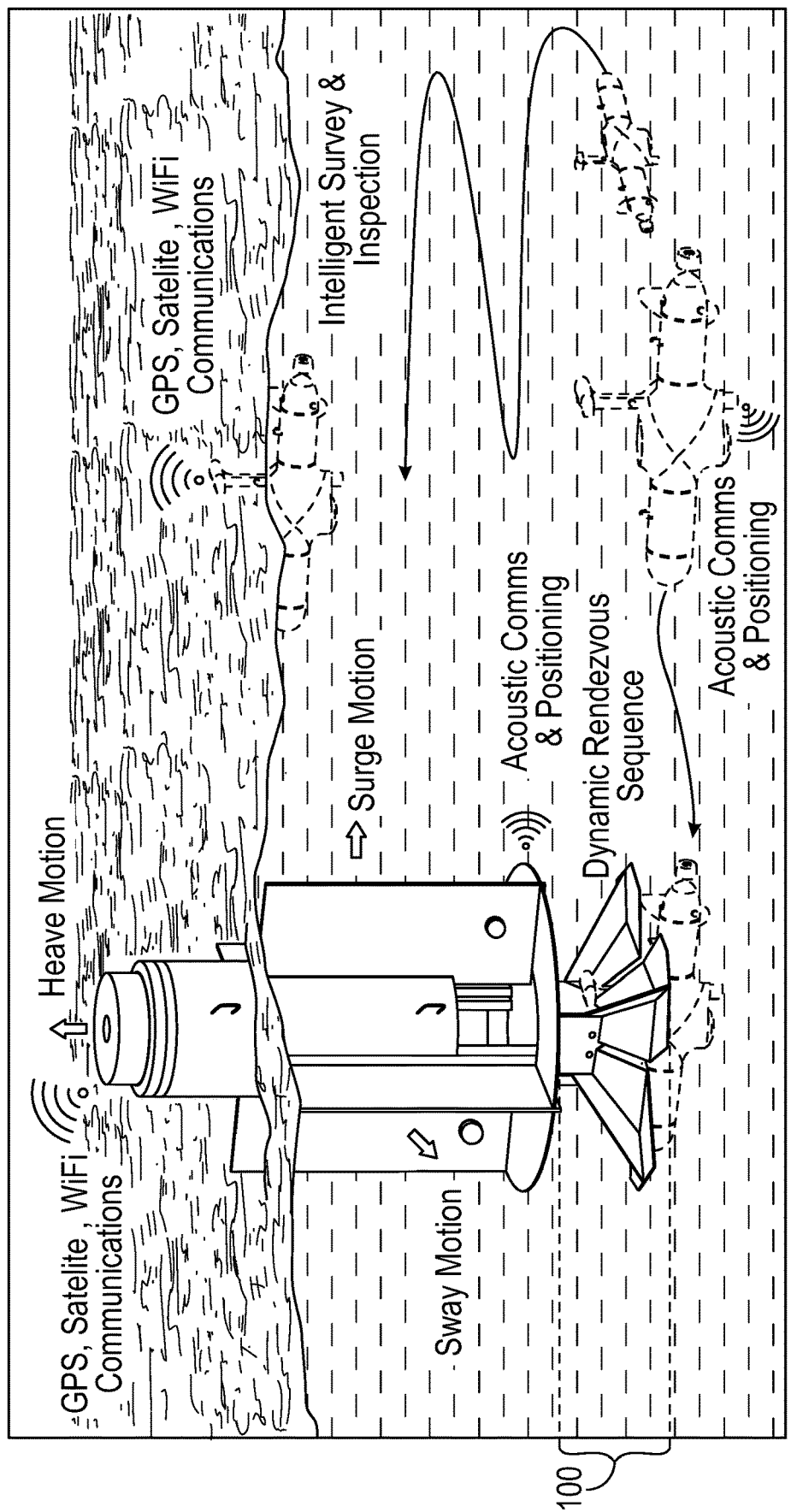
FIG. 7 shows a perspective view of how the embodiment of FIG. 6 is deployed and used in the water.

Referring to FIG. 7, shown is a perspective view of how the embodiment of FIG. 6 is deployed and used in the water: a single body Spar OWC WEC with V-shaped Channels (WEC Wave Channels) 164 with an Attached AUV docking station comprised of a Cloverleaf Heave Plate 100 that has leaflets or lobes 120 attached to ramps to form V-Shaped Dock Frame Channels 164 leading to Dock Frame Slots 168. A torpedo-type AUV with a mast M is shown conducting an ocean survey and data collection mission (or mission), transmitting data at surface, navigating back to the WEC, and docked at the attached AUV docking station with the Cloverleaf Heave Plate 100.

Referring to FIGS. 8A, 8B, 8C and 8D, shown are docking sequences interfacing with the Cloverleaf Heave Plate 100. FIG. 8A shows a top view of a preferred embodiment of a torpedo-type AUV having a mast M interfacing with outer edge of the Cloverleaf Heave Plate 100 and being guided toward a slot (dock frame slot 168) between the ramps 140 and the leaflets of the Cloverleaf Heave Plate mounted on the dock frame 160. FIG. 8B shows a top view of a preferred embodiment of a torpedo-type AUV having a mast M interfacing with a dock frame slot 168 between the ramps 140. FIG. 8C shows a perspective view of a preferred embodiment of a torpedo-type AUV with a mast M interfacing with a dock frame slot 168 between the ramps 140. FIG. 8D shows a perspective view of a preferred embodiment of a torpedo-type AUV with a mast M docking with, and removably attaching to, the dock frame 160 through the use of electromagnets (not depicted).

The best mode for carrying out the presently preferred embodiment of the invention is to use it as an omnidirectional compact and rapidly manually deployable integrated wave-powered mobile AUV docking station to enable marine-resident ocean observing on the open ocean. The present invention functions as a power station, capable of transmitting power to an AUV and functioning as a data communication center. The AUV navigates and functions via an onboard computer and computer program that dictates how it operates and responds to new information. When the AUV is docked to the presently preferred embodiment of the invention, the WEC transmits power to the AUV and receives ocean survey mission data from completed missions. The WEC additionally transmits a new mission (a new survey path) and any updates to the computer of the AUV. The present invention is preferably compact in that its components, disassembled, fit into an approximate 46×48× 96 inch container. It is also preferably easily and rapidly manually assembled and deployable by two people (without the use of a crane) and can be deployed from small ocean vessels. The presently preferred embodiment of the invention enables marine-resident ocean observation capabilities through on-site power production, with deployment durations longer than 3 months.

The presently preferred embodiment of the invention preferably is untethered (i.e. it drifts on the open ocean and is uninhibited by a mooring line secured to the sea floor through an anchor or other similar device). However, it can be tethered and fixed to a location via a mooring line and anchor when there is reason for concern, such as strong onshore currents. The present invention preferably does not require a tether for maintaining its position in mild ocean currents less than approximately 0.5 knots. It uses regional ocean currents to propel itself from one geographic location to another through the large subsurface (submerged) profile of the device, as seen in FIG. 7. Thrusters preferably located on the waveguides (panels) allow the device to control its heading, and to propel itself at a preferable maximum sustained speed of approximately 0.5 knots.

Wave Energy Harvesting Principles of Operation

The presently preferred embodiment of the invention utilizes geometric features to achieve Helmholtz resonance for wind-generated waves (wind waves) of wave periods ranging from approximately 5 to 9 seconds. Wave period is the time it takes for two successive crests (one wavelength) to pass a specified point. Helmholtz resonance is the phenomenon when the amplitude of a specific frequency wave becomes amplified as it is focused into a chamber of a specific area. The WEC preferably funnels wind-generated waves into a hollow cylindrical compression chamber via the WEC Wave Channels (V-shaped channels formed by waveguides that protrude every 90 degrees from the compression chamber, located along vertical axis of the WEC). The compression chamber is preferably long and cylindrical allowing the device to behave like a spar buoy, which is well-known in the art for its stability in pitch and roll motions. Pitch is the rotation of a device about its transverse axis. Roll is the rotation of a device about its longitudinal axis. Yaw is the rotation of a device about its vertical axis. The circular heave plate, located toward the base of the compression chamber, restricts vertical motion, inducing relative motion between the structure and the wave. As the water surface moves up and down inside the compression chamber, the water forces the trapped air through a bi-directional flow "power take off" generator (PTO) located at the top of the WEC. Examples of bi-directional flow PTOs include (without limitation) bi-directional impulse turbines, wells turbines, and flexible piezoelectric devices (FPED). Impulse turbines direct the incident flow to ensure that a rotating turbine spins in a single direction. Wells turbines utilize symmetric airfoils to cause the rotating turbine to spin in a single direction. FPEDs are piezoelectric membranes laminated to a flexible material that allows the material to vibrate as a fluid flows past it. As the material vibrates, the piezoelectric material is deformed, inducing the flow of charged particles, and thus converting the moving fluid into electricity. The flexible material is typically a polymer.

Compression Chamber and Compression Chamber Frame

At the core of the presently preferred embodiment of the invention is the compression chamber of the WEC seen in FIGS. 6 & 6A. The compression chamber is preferably a hollow cylinder that functions as a moon pool. A moon pool is an opening in the hull of a floating vessel that creates a pool that is directly connected to the ocean. The compression chamber is preferably sealed with an air driven turbine mounting surface at the above-surface end of the compression chamber. Preferably, a flange provides a bolting and sealing surface to ensure air does not leak out of the compression chamber. The compression chamber is preferably between 20-22 inches in diameter, between 50-53 inches tall, and has a 1½-2 inch wall thickness. The hollow compression chamber provides the bulk of the buoyancy while the presently preferred invention is floating. The walls of the compression chamber provide enough of a buffer to protect the compression chamber from puncturing while at sea. The compression chamber can be preferably made of any material with a high strength to weight ratio, including (for example) aluminum and aluminum composites, 3D printed composites such as carbon fiber, and thermoplastics such as High Density Polyethylene (HDPE). The overall density of the compression chamber and compression chamber frame preferably should be between 500-600 kg/m$^3$. Compression chambers and compression chamber frames are known in the prior art.

The compression chamber is preferably located within, and attached to, a load bearing compression chamber frame (tube cage) shown in FIG. 6A. The compression chamber frame is preferably attached to the outer surface of the compression chamber and is comprised of aluminum tubing that is bent to create a reinforcing skeleton. The compression chamber frame is preferably attached to an aluminum flange located at the top of the compression chamber through welding or similar or equivalent attachment methods. The tubes of the compression chamber frame extend downward between 50-53 inches to the bottom edge of the compression chamber. The tube cage is preferably welded or equivalently attached to a set of eight rectangular bars that span 50 inches from the top edge of the waveguides the circular heave plate. The rectangular bars are preferably affixed in pairs around the compression chamber every 90 degrees. The pair of rectangular bars form a inch slot into which a wave guide can mount. The rectangular bars also create a rigid connection between the compression chamber and the heave plate, because the compression chamber is preferably suspended above the circular heave plate. The distance between the bottom of compression chamber to the circular heave plate is preferably approximately 14.75 inches but can be between 13-16 inches. The distance between the compression chamber and the circular heave plate allows the device to have openings to the ocean between waveguides on all sides, which allows the compression chamber to capture wave energy from every direction. Electrical cables are preferably run from the bi-directional flow PTO turbine located at the top of the device to batteries and other electronics located below the circular heave plate through hollow rectangular tubing. Flotation foam can preferably be used around the compression chamber frame (see FIG. 6A).

WEC Wave Channels

Affixed to the exterior of the compression chamber are flat vertical panels, known as waveguides, seen in FIGS. 6 and 6A. The waveguides preferably protrude from the central compression chamber of the WEC every 90 degrees forming V-shaped wave channels (WEC Wave Channels). WEC Wave Channels are known in the prior art. The waveguides insert in between slotted rectangular rails—approximately ¾ inch gaps between the 1-inch rectangular tubes on the compression chamber exterior (see FIG. 6A). They also are affixed to the circular heave plate preferably via bolted connection or by slotted rails, such as T-slots, or using any other similar or equivalent attachment methods. The waveguides are preferably rectangular and approximately 17 inches wide, approximately 50 inches tall, and approximately ¾ inch thick. The waveguides are preferably impermeable, and do not allow water to flow through them, such that incoming waves are funneled through the WEC Wave Channels towards the compression chamber. The waveguides can be made from any material with a high strength to weight ratio, for example: aluminum and aluminum composites, carbon fiber, and 3D printed composites. They preferably have a density of approximately 1430 kg/m$^3$, but their density can be between 1400-1500 kg/m$^3$.

The presently preferred WEC has a few modes of control that affect its mobility. Waterproof propulsive devices, seen in FIGS. 3, 6, & 7, are preferably inlaid into the waveguides and make the present invention mobile. Preferably, the WEC propulsion system is comprised of two waterproof thrusters that provide up to approximately 38 lbf (pound of force) of thrust, but up to four thrusters can be used. These thrusters are used to control the position of the present invention on the surface via direct yaw control and forward motion and allow the WEC to maintain a stable station keeping mode to assist in docking of the AUV. This stable station keeping mode incorporates a proportional-integral-derivative (PID) control to maintain position using the thrusters.

Circular Heave Plate

Preferably affixed to the submerged base of the compression chamber frame is a circular heave plate that is approximately 60 inches in diameter and approximately k of an inch thick. This circular heave plate functions as the primary heave plate. It provides the present invention with the majority of its added mass and dry mass. As the present invention is designed to be compact and rapidly manually deployable, the circular heave plate is preferably comprised of 8 segments that can be broken down and stored into an approximately 46"×48"×96" container. The 8 circular heave plate segments are preferably arc-shaped wedges (truncated sectors) that connect to a central approximately 20 inch diameter circular segment, as seen in FIG. 3. The circular heave plate is preferably made from aluminum and aluminum composites, carbon fiber, and other composites such as epoxy and fiberglass laminate. The density of the circular heave plate is preferably 2700 kg/m$^3$ but can be between 2600-2800 kg/m$^3$.

Cloverleaf Heave Plate

Affixed to the underside of the submerged circular heave plate is the dock frame and ramped Cloverleaf Heave Plate, best seen in FIGS. 2A, 2B, 2C, 2D and 3A. The Cloverleaf Heave Plate preferably comprises four flat truncated leaflets or lobes. Each leaflet or lobe is preferably an irregular octagon shape with two sets of parallel sides, with a 10-degree taper between the two longest sides. The leaflets or lobes are preferably attached at one end to ramps, which are then connected to a central rectangular dock frame. The leaflets or lobes are supported on their underside by vein-like structural supports and are supported on their topside by a triangular support panel that rigidly connects them to the ramps. As seen in FIG. 2, the leaflets or lobes and ramps are affixed radially to the dock frame every 90 degrees. When mounted to the dock frame, the spacing between the leaflets or lobes, and ramps, create 2 features: (a) an approximately 80-degree angle V-shaped channel between the leaflets or lobes (V-shaped dock frame channel), with side lengths of approximately 14.25 inches, and (b) an approximately 8 inch long, approximately 1.75 inch wide slot (dock frame slot) between the ramps where the mast of an AUV can interface, seen in FIGS. 4, 6, & 7. The V-shaped dock frame channel allows the AUV mast to be guided towards the dock frame slot as the AUV approaches for docking to the WEC. The dock frame slot directly guides the AUV mast into the dock frame, where electromagnets secure the AUV.

The dock frame connects the circular heave plate to the Cloverleaf Heave Plate, while also providing a protected cavity to house the WEC electronics. WEC electronics include but are not limited to charge controllers, inductive charging electronics, batteries, data acquisition systems, the WEC navigation computer, and other critical electronics that maintain the autonomy and power production functionalities of the WEC.

Communication System

The presently preferred embodiment of the invention uses multiple forms of communication that act between the WEC and AUV, from the WEC to an onshore information processing center, and from the AUV to an onshore information processing center. The present invention preferably utilizes acoustic, optical, satellite, and Wi-Fi communication.

The WEC and the AUV are preferably equipped with ultra-short baseline acoustic modems. The full duplex communication system operates via acoustic wave transmission and receipt through transducer heads. As the AUV travels away from the WEC, the acoustic modems maintain a communication link for up to 3.5 kilometers at a data transfer rate of ~15 kbps.

In order to allow for a quicker connection, a full duplex optical communication modem is preferably used. Both the WEC and the AUV are outfitted with an optical communication modem, which preferably has a 0.6 Mbps transfer rate when aligned. The optical modems, which preferably have LEDs and photo sensors, are aligned when the AUV is docked to the WEC, providing the communication link.

The preferred embodiment of the WEC and the AUV are preferably equipped with Subscriber Identity Module (SIM)-less Short Burst Data (SBD) transceivers and antennae that allow for communication to an onshore information processing center and onshore mission control center via a Worldwide wireless communications network, preferably a satellite network, such as the Iridium link. The Iridium link provides L band voice and data information coverage to satellite phones, pagers and integrated transceivers over the entire surface of Earth and is presently one of the few satellite networks that covers the entire globe. The Iridium link allows for collected data to be sent to the onshore information processing center, where it is relayed to a mission control center. The mission control center is also able to transmit new survey paths or changes in the AUV source code via the Worldwide wireless communications network.

While the Worldwide wireless communications network is essential at sea, it is not necessary when deploying and recovering the WEC. A short-range Wi-Fi system with a preferable operating range of 500 meters is installed in both the preferred embodiment of the AUV and the WEC. This system is supported by a wireless network switch with an external antenna offering an approximate 100 Mbps data transfer rate.

Control Strategy

The presently preferred invention preferably includes a control scheme to improve performance on missions called "flow-sided navigation"; this concept focuses on positioning the WEC into a current that will push the body along a trajectory, instead of using thrusters. This conserves energy and extends operational range.

Extreme Sea State Survival

On a hurricane monitoring mission, extreme and unstable sea states can be expected, with anticipated damage to devices located on the sea surface. To mitigate this risk, an optional ballasting system (that fills, removes, and transfers water to the WEC) can be preferably implemented to sink the WEC 5-10 meters below the surface of the water to reduce the risk of damage to the WEC from unstable sea conditions. The ballasting system can preferably be activated remotely, or by sensing highly-turbulent water motion.

Charging System

The torpedo-type AUV used with the presently preferred embodiment of the invention is an independent body that relies on a wireless inductive AUV charging system that receives power from the WEC. This AUV charging system has been optimized and validated for use in water and has an expected power transfer efficiency of approximately 60%. The AUV and dock frame have mating inductive antennas that align during the docking process. The inductive antennae on the AUV is shown in FIG. 5 and it aligns with the underside of the dock frame when the AUV is docked.

The WEC employs a DC power generator that provides power to all WEC electronics and the AUV charging system. The DC power generator converts the rotating energy of a turbine PTO into electrical energy. Wave energy is variable in power output, and to handle this, a maximum power point tracking (MPPT) charge controller is used. This MPPT charge controller optimizes the current output to the battery that will lead to the highest efficiency of power captured from the WEC. The WEC charging system has an expected loss of approximately 40%.

Waterproofing & Connectors

Most electronics in the presently preferred embodiment of the invention are housed in watertight pressure cylinders. These pressure cylinders are preferably made of aluminum and are preferably capped on both ends with pressure bulkheads using a double O-ring seal. All penetrations through these bulkheads are done with Subconn waterproof connectors. Electronic elements that are flooded (with water) in body sections require potting (i.e. a process of filling an electronic assembly with a solid or gelatinous compound for high voltage assemblies by excluding gaseous phenomena such as corona discharge, for resistance to shock and vibration, and for the exclusion of water, moisture, or corrosive agents).

Assembly

From its packaged state, the presently preferred embodiment of the invention is rapidly deployable and can be assembled in 1-2 hours. The main components of the WEC (the compression chamber and compression chamber frame) will be attached and placed in a vertical position on shore. The bi-directional flow "power take off" generator (PTO) will be mated with and sealed to the flange at the top of the compression chamber. The circular heave plate is then attached to the bottom of the compression chamber frame. The waveguides are fastened to the compression chamber and compression chamber frame and the circular heave plate. Once built, the Cloverleaf Heave Plate and the dock frame will be attached to the bottom of the circular heave plate using bolts or other similar or equivalent attachment methods.

Primary Market Activities

AUVs are useful in many different applications and industries. Blue economy markets taking advantage of AUVs include research centers, oil and gas companies, and the defense sector. Scientific use of AUVs is focus on environmental data collection. Within the offshore oil and gas industry, the primary market activities focus on infrastructure, including the installation, maintenance, and inspection of oil rigs, pipelines, and mooring systems. The offshore defense industry is focused on coastal surveillance, shipping lane security, and general battlespace sensing.

In each example above, the preferred embodiment of the AUV functions as a "profiling body," where the AUV moves (cycles) between two depths to measure ocean variables along a path. These ocean variables can include temperature, salinity, depth, and ocean current direction and velocity. In the example of seafloor mapping, the AUV uses its relative location to the WEC and other navigation markers to determine its location in the global frame of reference. The AUV conducts a survey of the seafloor using sonar (sound navigation and ranging) to scan for objects and other features.

INDUSTRIAL APPLICABILITY

The present invention is useful whenever if is desired to have a compact, rapidly manually deployable single body WEC with attached AUV docking system that can capture wave power from any direction for marine-resident ocean observing on the open ocean.

What is claimed is:

1. A wave-powered docking station having a dry mass, for charging and communicating with an autonomous underwater vehicle, said vehicle having an electrically conductive portion, comprising:
   a cylindrical compression chamber with an interior, a submerged open end and an exposed closed end, wherein when said submerged open end is submerged in the ocean, trapped air is enclosed in said interior of said compression chamber between the exposed closed end and the surface of said ocean;
   a power take off generator attached to said compression chamber and in fluid communication with said trapped air when said submerged open end is submerged in said water;
   waveguides, having chamber edges, top edges and bottom edges, affixed radially around said compression chamber at said chamber edges and extending below said submerged open end, forming wave channels between said waveguides leading to said submerged open end of said compression chamber;

wherein said wave channels direct wind waves having wave energy from any direction toward said compression chamber and said wave channels amplify movement of said surface of the ocean in said compression chamber;

a first heave plate having a top surface and a bottom surface, affixed so that said submerged open end of said compression chamber is positioned a distance above said top surface of said first heave plate, whereby said wave channels direct said wind waves from any direction toward said compression chamber for consistent capturing of a portion of said wave energy;

a dock frame affixed to said bottom surface of said first heave plate containing a housing for electronics to assist with docking of said autonomous underwater vehicle;

a second heave plate comprising:
 ramps having dock ends and lobe ends, attached to said dock frame at said dock ends, and radiating outward from said dock frame, defining dock frame slots having channel ends and frame ends between each of said ramps, extending radially outward from said dock frame;
 truncated oblong lobes having tip ends and ramp ends, attached to said ramps at said ramp ends and defining V-shaped dock frame channels between each of said lobes, extending radially outward from said dock frame;

charging interfaces at said frame ends of said dock frame slots configured to receive said electrically conductive portion of said autonomous underwater vehicles;

whereby when said wave-powered docking station is submerged in said ocean, said wind waves from any direction are directed by said waveguides toward said compression chamber and force said surface of the ocean to move vertically in said compression chamber so that said trapped air is pushed through said power take off generator, generating power which can be used to charge said autonomous underwater vehicle; and whereby when said autonomous underwater vehicle approaches said wave-powered docking station, said V-shaped dock frame channels guide said autonomous underwater vehicle toward and into said dock frame slots, whereby said electrically conductive portion is received by said charging interfaces for charging and communicating with said autonomous underwater vehicle.

2. A wave-powered docking station having a dry mass, for charging and communicating with an autonomous underwater vehicle, said vehicle having an electrically conductive portion, comprising:

said docking station having a cylindrical compression chamber with an interior, a submerged open end, an exposed closed end and at least two diametrically opposed openings in said compression chamber at said submerged open end, wherein when said submerged open end is submerged in the ocean, trapped air is enclosed in said interior of said compression chamber between the exposed closed end and the surface of said ocean;

a power take off generator attached to said compression chamber and in fluid communication with said trapped air when said submerged open end is submerged in said water;

waveguides, having chamber edges, top edges and bottom edges, attached by said chamber edges to said compression chamber, at least one on each side of said diametrically opposed openings, extending radially outward from said compression chamber, forming wave channels between said waveguides on each side of said diametrically opposed openings leading to said compression chamber;

wherein said wave channels direct waves having wave energy from a constrained set of directions aligned with said diametrically opposed openings toward said compression chamber and said wave channels amplify vertical movement of said surface of the ocean in said compression chamber;

a first heave plate having a top surface and a bottom surface, affixed to said compression chamber so that said submerged open end of said compression chamber is positioned a distance above said top surface of said first heave plate at said diametrically opposed openings, whereby said wave channels direct said waves from said constrained set of directions towards said compression chamber for maximizing capturing of said wave energy from a constrained set of directions;

a dock frame affixed to said bottom surface of said first heave plate containing a housing for electronics to assist with docking of said autonomous underwater vehicle;

a second heave plate comprising:
 ramps having dock ends and lobe ends, attached to said dock frame at said dock ends, and radiating outward from said dock frame, defining dock frame slots having channel ends and frame ends between each of said ramps, extending radially outward from said dock frame;
 truncated oblong lobes having tip ends and ramp ends, attached to said ramps at said ramp ends and defining V-shaped dock frame channels between each of said lobes, extending radially outward from said dock frame;
 charging interfaces at said frame ends of said dock frame slots configured to receive said electrically conductive portion of said autonomous underwater vehicles;

whereby when said wave-powered docking station is submerged in said ocean, said waves having wave energy from a constrained set of directions are directed by said waveguides toward said compression chamber and force said surface of the ocean to move vertically in said compression chamber so that said trapped air is pushed through said power take off generator, generating power which can be used to charge said autonomous underwater vehicle; and whereby when said autonomous underwater vehicle approaches said docking station, said V-shaped dock frame channels guide said autonomous underwater vehicle toward and into said dock frame slots, whereby said electrically conductive portion is received by said charging interfaces for charging and communicating with said autonomous underwater vehicle.

3. A wave-powered docking station having a dry mass, for charging and communicating with an autonomous underwater vehicle, said vehicle having an electrically conductive portion, said docking station having a cylindrical compression chamber with an interior, a submerged open end, an exposed closed end and at least two diametrically opposed openings in said compression chamber at said submerged open end, wherein when said submerged open end is submerged in the ocean, trapped air is enclosed in said interior of said compression chamber between the exposed closed end and the surface of said ocean;
a power take off generator attached to said compression chamber and in fluid communication with said trapped air when said submerged open end is submerged in said water;
waveguides, having chamber edges, top edges and bottom edges, attached by said chamber edges to said compression chamber, at least one on each side of said diametrically opposed openings, extending radially outward from said compression chamber, forming wave channels between said waveguides on each side of said diametrically opposed openings leading to said compression chamber;
wherein said wave channels direct waves having wave energy from a constrained set of directions aligned with said diametrically opposed openings toward said compression chamber and said wave channels amplify vertical movement of said surface of the ocean in said compression chamber;
a first heave plate having a top surface and a bottom surface, affixed to said compression chamber so that said submerged open end of said compression chamber is positioned a distance above said top surface of said first heave plate at said diametrically opposed openings, whereby said wave channels direct said waves from said constrained set of directions towards said compression chamber for maximizing capturing of said wave energy from a constrained set of directions;
the improvement comprising:
a dock frame affixed to said bottom surface of said first heave plate containing a housing for electronics to assist with docking of said autonomous underwater vehicle;
a second heave plate comprising:
  ramps having dock ends and lobe ends, attached to said dock frame at said dock ends, and radiating outward from said dock frame, defining dock frame slots having channel ends and frame ends between each of said ramps, extending radially outward from said dock frame;
  truncated oblong lobes having tip ends and ramp ends, attached to said ramps at said ramp ends and defining V-shaped dock frame channels between each of said lobes, extending radially outward from said dock frame;
charging interfaces at said frame ends of said dock frame slots configured to receive said electrically conductive portion of said autonomous underwater vehicles;
whereby when said wave-powered docking station is submerged in said ocean, said waves having wave energy from a constrained set of directions are directed by said waveguides toward said compression chamber and force said surface of the ocean to move vertically in said compression chamber so that said trapped air is pushed through said power take off generator, generating power which can be used to charge said autonomous underwater vehicle; and
whereby when said autonomous underwater vehicle approaches said docking station, said V-shaped dock frame channels guide said autonomous underwater vehicle toward and into said dock frame slots, whereby said electrically conductive portion is received by said charging interfaces for charging and communicating with said autonomous underwater vehicle.

4. The wave-powered docking station according to any one of claims 1-3, wherein said dry mass is operably between 100 kg to 500 kg.

5. The wave-powered docking station according to any one of claims 1-3, wherein said dry mass is preferably between 100 kg to 209 kg.

6. The wave-powered docking station according to any one of claims 1-3, wherein said distance above said top surface of said first heave plate is operably between 13 inches and 16 inches.

7. The wave-powered docking station according to any one of claims 1-3, further comprising batteries operably connected to said power take off generator for storing said power.

8. The wave-powered docking station according to any one of claims 1-3, wherein said power take off generator is chosen from the group consisting of bi-directional impulse turbines, wells turbines, and flexible piezoelectric devices.

9. The wave-powered docking station according to claim any one of claims 1-3, further comprising propulsive devices inlaid in said waveguides for increasing mobility of said wave-powered docking station.

* * * * *